United States Patent
Manabe et al.

(10) Patent No.: US 7,727,949 B2
(45) Date of Patent: Jun. 1, 2010

(54) CLEANING AGENT FOR THERMOSTATIC CHAMBERS

(75) Inventors: Kazuhide Manabe, Ibaraki (JP); Hiroshi Oono, Tokyo (JP)

(73) Assignees: Wako Pure Chemical Industries, Ltd., Osaka (JP); San-Ai Oil Co., Ltd., Tokyo (JP)

( * ) Notice: Subject to any disclaimer, the term of this patent is extended or adjusted under 35 U.S.C. 154(b) by 0 days.

(21) Appl. No.: 11/885,477

(22) PCT Filed: Mar. 3, 2006

(86) PCT No.: PCT/JP2006/304046
§ 371 (c)(1), (2), (4) Date: Aug. 31, 2007

(87) PCT Pub. No.: WO2006/093249
PCT Pub. Date: Sep. 8, 2006

(65) Prior Publication Data
US 2008/0214420 A1    Sep. 4, 2008

(30) Foreign Application Priority Data
Mar. 4, 2005    (JP) ............................. 2005-059849

(51) Int. Cl.
C02F 1/76    (2006.01)
(52) U.S. Cl. ..................... 510/504; 510/357; 510/424; 510/426; 510/428
(58) Field of Classification Search ................ 510/504, 510/357, 424, 426, 428
See application file for complete search history.

(56) References Cited

U.S. PATENT DOCUMENTS

| | | | |
|---|---|---|---|
| 5,230,811 A * | 7/1993 | Shimotomai et al. ........ 210/755 |
| 5,368,778 A | 11/1994 | Shimotomai et al. | |
| 5,576,284 A | 11/1996 | van Buskirk et al. | |
| 5,856,290 A | 1/1999 | van Buskirk et al. | |
| 6,191,092 B1 | 2/2001 | Bragulla et al. | |
| 6,309,658 B1 * | 10/2001 | Xia et al. .................... 424/405 |
| 6,342,473 B1 * | 1/2002 | Kott et al. ................... 510/357 |
| 6,599,370 B2 * | 7/2003 | Skee ............................. 134/3 |
| 2007/0179079 A1 * | 8/2007 | Kilkenny et al. ............. 510/499 |

FOREIGN PATENT DOCUMENTS

| | | |
|---|---|---|
| EP | 1195091 | 4/2002 |
| JP | A-1-40599 | 2/1989 |
| JP | A-1-319407 | 12/1989 |
| JP | 10-506143 | 6/1998 |
| JP | 2001200291 | * 7/2001 |
| JP | 2001-521574 | 11/2001 |
| JP | 2004-59806 | 2/2004 |
| JP | 2004149678 | * 5/2004 |
| JP | 2004-161940 | 6/2004 |

OTHER PUBLICATIONS

International Search Report for PCT/JP2006/304046 completed May 15, 2006.
English translation of the Written Opinion for PCT/JP2006/304046 mailed Sep. 20, 2006.
* cited by examiner

*Primary Examiner*—Mark Eashoo
*Assistant Examiner*—M. Reza Asdjodi
(74) *Attorney, Agent, or Firm*—Finnegan, Henderson, Farabow, Garrett, & Dunner, LLP

(57) ABSTRACT

[PROBLEMS] The present invention provides a novel cleaner having bacteria-proof, fungi-proof and algae-proof effects, which is added to a reaction thermostat using water as medium in scientific apparatus, particularly a thermostatic water bath in an automatic analyzer.
[SOUTLIN] A cleaner for a thermostatic water bath, which comprises a quaternary ammonium salt as shown by the general formula [1] described below and/or a preservative agent having amphoteric surface activity, and a surface active agent,

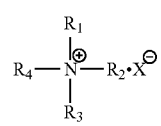

[1]

wherein $R_1$ to $R_4$ independently represent an alkyl group, provided that at least one among $R_1$ to $R_4$ is an alkyl group having 8 to 18 carbon atoms, and at least one among them is a lower alkyl group having 1 to 3 carbon atoms; and $X^-$ represents an anion derived from a carboxylic acid having two or more carbon atoms; and a cleaning method of a thermostatic water bath, wherein the cleaner is added to a thermostatic water bath.

13 Claims, No Drawings

CLEANING AGENT FOR THERMOSTATIC CHAMBERS

TECHNICAL FIELD

The present invention relates to a novel cleaner having bacteria-proof, fungi-proof and algae-proof effects which is to be added to a reaction thermostat using water as medium in scientific apparatus, particularly a thermostatic water bath in an automatic analyzer.

BACKGROUND ART

Generally, in the field of the clinical chemistry, measurement of physiologically active substances in such organism samples as serum, urine or tissue fluid, e.g., enzymes, lipid, protein, etc., is made widely for the purpose of diagnosis of diseases and grasping disease conditions.

Automatic analyzers have various features such as quick operation, high efficiency, high accuracy, convenient handling, small amounts of samples and reagent required for analysis and capability of saving energy, so that they are employed widely in the field noted above. The measurement is usually done in the order of taking a sample, adding a reagent, mixing, incubation, color comparison (measurement of absorbance) and calculation. Of these, the incubation is effected by an air bath system, a water bath system or oil bath system. Among them, most generally a water bath is used as thermostat bath. The reaction temperature is usually below 50° C. and most generally 37° C. The absorbance is measured by a system in which measurement is done by sucking up reaction solution from a reaction vessel to a cell, or a system in which the reaction vessel is measured directly as measurement cell. At present, the latter system is mainly adopted. In the measurement of this system with a water bath as thermostatic water bath, light from a light source disposed outside the water bath is passed through the water bath and through a reaction vessel therein to be detected by a sensor disposed on the opposite side of the water bath. In this way, the reaction vessel is also used as cell for measuring. The wavelength used for measurement is usually 340 to 900 nm.

Usually, water in the thermostatic water bath in the automatic analyzer is replaced once or several times a day. At the time of water replacement, air bubbles are frequently attached to the outer wall of the reaction vessel. To prevent this, a slight amount of cleaner is usually added. The cleaner used to this end is usually prepared from various surface active agents as main component by adding a chelating agent, a pH controller, a preservative agent, etc. to the main component. It has poor bubble-formation property, and it is added to a concentration of 0.05 to 2.0 w/w % in the water bath. However, in the water bath using water in the thermostatic water bath containing such a cleaner, the component of cleaner serves as source of nutrition to promote generation of algae and growth of various microorganisms (bacteria etc.) in the use of long time running (Any preservative agent added can not substantially provide any effect). In consequence, a great error in the measurement of the absorbance was produced by a cause such as generation of algae on the reaction vessel and/or increase in turbidity in water in the thermostatic water bath, etc. For this reason, as the analyzer requires sufficient daily maintenance control in the use of the apparatus, a great deal of labor is required for accuracy maintenance and maintenance control by frequently monitoring or periodically cleaning the inside of the water bath. Thus, although addition of a cleaner to a thermostatic water bath is necessary and effective, sufficient daily maintenance control is required to be done, therefore, improvement in this respect is strongly desired.

The present inventors thought that a cause for generation of algae and growth of microorganisms (bacteria etc.) is that the final concentration of the preservative agent present as a component of the cleaner in the thermostatic water bath is less than an effective concentration in the case of ordinary concentration of the cleaner (which is 0.05 to 2.0 v/v %). Accordingly, the present inventors considered that triazine derivatives which were effective in small quantity, that is, low effective concentration preservative agents were suitable for a preservative agent as a component of the cleaner. And after intensive researches and investigations, the present inventors found that, it is possible to prevent generation of algae and growth of microorganisms (bacteria etc.) in the thermostatic water bath by using a cleaner containing a triazine derivative and a surface active agent, and filed it as a patent application (Patent Document 1).

However, it was found that although the cleaner having the composition noted above permits prevention of the generation of algae and growth of microorganisms (bacteria etc.) in the thermostatic water bath for a long time, but when the liquid concentrate of the cleaner is preserved at a high temperature, some of its components are decomposed with a lapse of time, thus producing substances which have absorption in a wavelength range of 300 to 900 nm used for the measurement and are liable to cause great errors in the absorbance measurement.

Therefore, the present inventors further conducted intensive investigations, and have found that the cleaner obtained by adding a compound represented by the following formula [A]:

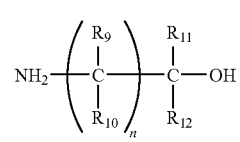

[A]

[wherein $R_9$, $R_{10}$, $R_{11}$ and $R_{12}$ are independently an a hydrogen atom, a methyl group or a hydroxymethyl group, and n is an integer of 1 to 5] to a cleaner composed of a triazine derivative as low effective concentration of a preservative agent and a surface active agent can prevent not only the generation of algae and growth of microorganisms (bacteria etc.) in the thermostatic water bath, but also restrain formation of a substance having absorption in the measurement wavelength range (300 to 900 nm) as a result of decomposition of a component of the cleaner when the cleaner is preserved at a high temperature. This invention also is already filed as a patent application (Patent Document 2).

On the other hand, for prevention of nosocomial infection by various types of bacteria (for example, *Pseudomonas aeruginosa*, *Staphylococcus aureus*, etc.), various kinds of pretreatment are sometimes demanded. Although no example is reported that a cause of such infection is a thermostatic water bath in an automatic analyzer, there are some thoughts that prevention at a pre-stage is necessary, and there are some opinions to desire development of a cleaner having stronger germicidal effect than conventional cleaners.

[Patent Document 1] JP-A-1-40599
[Patent Document 2] JP-A-1-319407

DISCLOSURE OF THE INVENTION

Problems to be Solved by the Invention

The present invention has been made by considering the above-described circumstances, and an object of the invention is to provide a novel cleaner which is added to a reaction thermostat using water as medium in a scientific apparatus, particularly a thermostatic water bath in an automatic analyzer, which can provide bacteria-proof, fungi-proof and alga-proof effects for a long time and produces no (or less) substances having absorption in the measurement wavelength range of 300 to 900 nm as a result of such as decomposition of its component, and which has further stronger germicidal effect than conventional ones (having germicidal effect in a short period) and can be respond to requirement of avoiding and preventing nosocomial infection.

Means for Solving Problems

The present invention has been made to solve the problems described above, and is constituted by the following constitution:

(1) A cleaner for a thermostatic water bath, which comprises a quaternary ammonium salt represented by the following general formula [1] and/or a preservative agent having amphoteric surface activity, and a surface active agent:

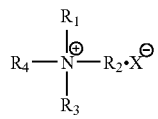

[I]

wherein $R_1$ to $R_4$ are each independently an alkyl group, with the proviso that at least one of $R_1$ to $R_4$ is an alkyl group having 8 to 18 carbon atoms, and at least one of them is a lower alkyl group having 1 to 3 of carbon atoms; and $X^-$ is an anion derived from a carboxylic acid having two or more carbon atoms.

(2) A method for cleaning a thermostatic water bath, characterized by adding the cleaner according to above in (1) to a thermostatic water bath.

Namely, although conventional cleaners for a thermostatic water bath had excellent antimicrobial effects, there also were requirements of avoiding and preventing nosocomial infection as described above. Therefore, for the purpose of developing a novel cleaner for a thermostatic water bath, which also has excellent germicidal effects, the present inventors conducted extensive researches and investigations in order to find out among commonly used antimicrobial agents and germicidal agents those that attain the above-described purposes.

In an automatic analyzer provided with a thermostatic water bath, a sample and reagents are mixed, heated in the thermostatic water bath, and then, measurement of absorbance is conducted using a reaction vessel itself as a cell for measurement. Therefore, a cleaner for a thermostatic water bath is required not to have absorption in the measurement wavelength range (300 to 900 nm) in an automatic analyzer. Thus, among the commonly used antimicrobial agents and germicidal agents, chlorhexidine and chlorhexidine gluconate, etc. have absorption in 300 to 900 nm, and cetyl pyridinium halide, etc. show a pale yellow to yellow color in their aqueous solution state which color inhibit absorption of UV, and thus any of these were not proper to be used as a cleaner for a thermostatic water bath.

Further, in measurement using an automatic analyzer, serum, enzyme, etc. are used, and therefore there also is a danger that these proteins contaminate water in a thermostatic water bath. Therefore it is necessary to be able to kill various germs etc. or suppress the growth thereof, even when these proteins are mixed into water in a thermostatic water bath. In this respect, benzalkonium chloride, benzenethonium chloride, etc. shows decrease of antimicrobial effects, etc. in the presence of proteins, and thus there remained dissatisfaction when they are used as a cleaner for a thermostatic water bath.

Furthermore, in order to avoid and prevent nosocomial infection as described above, those having germicidal activity against *Pseudomonas aeruginosa*, etc. are desirable.

Thus, the present inventors have further intensively studied, and as a result, have found that a quaternary ammonium salt represented by the following general formula

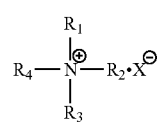

[I]

wherein $R_1$ to $R_4$ are each independently an alkyl group, with the proviso that at least one of $R_1$ to $R_4$ is an alkyl group having 8 to 18 carbon atoms, and at least one of them is a lower alkyl group having 1 to 3 carbon atoms; and $X^-$ is an anion derived from a carboxylic acid having two or more carbon atoms, and a preservative agent having amphoteric surface activity, satisfy all of these desires, and a cleaner for a thermostatic water bath containing these attain all of the purposes of the present invention, and thus have accomplished the present invention.

EFFECT OF THE INVENTION

The present invention provides an excellent cleaner for a thermostatic water bath, which can be used for a scientific apparatus, particularly an automatic analyzer, having a thermostatic water bath with water as medium to prevent generation of microorganisms (bacteria, etc.) in water in the water bath and accompanying deterioration of the measurement accuracy and also prevent generation and attachment of air bubbles on the outer wall of a reaction vessel in the water bath and produces no (or less) substance having absorption in the measurement wavelength range of 300 to 900 nm due to decomposition of some of its components at the time of storage, and which has further stronger germicidal effect than conventional one. Thus, by using the cleaner according to the present invention, it is possible to obtain pronounced effects in the ability of making use of the quickness, high efficiency, high accuracy and convenience of operation as primary merits of the automatic analyzer to greater extents than in the prior art.

BEST MODE FOR CARRYING OUT THE INVENTION

The cleaner for a thermostatic water bath according to the present invention contains a quaternary ammonium salt represented by the following general formula [1] and/or a preservative agent having amphoteric surface activity, and a surface active agent:

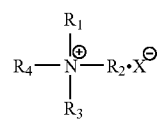

[I]

wherein $R_1$ to $R_4$ are each independently an alkyl group, with the proviso that at least one of $R_1$ to $R_4$ is an alkyl group having 8 to 18 carbon atoms, and at least one of them is a lower alkyl group having 1 to 3 carbon atoms; and $X^-$ is an anion derived from a carboxylic acid having two or more carbon atoms.

In the cleaner for a thermostatic water bath according to the present invention, the quaternary ammonium salt represented by the above described general formula [1], and/or the preservative agent having amphoteric surface activity, and the surface active agent are usually dissolved in a proper solvent, and as the solvent, water, especially pure water is preferable.

The alkyl groups shown by $R_1$ to $R_4$ in the quaternary ammonium salt represented by the general formula [1], which are used in the cleaner for a thermostatic water bath according to the present invention, may be straight chained, branched, or cyclic, and it usually includes those having 1 to 20 carbon atoms, preferably 1 to 12 carbon atoms, and specifically includes a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, a neopentyl group, an n-hexyl group, an isohexyl group, a sec-hexyl group, a tert-hexyl group, a 3-methylpentyl group, a 2-methylpentyl group, a 1,2-dimethylbutyl group, an n-heptyl group, an isoheptyl group, a sec-heptyl group, an n-octyl group, an isooctyl group, a sec-octyl group, an n-nonyl group, an n-decyl group, an n-undecyl group, an n-dodecyl group, an n-tridecyl group, an n-tetradecyl group, an n-pentadecyl group, an n-hexadecyl group, an n-heptadecyl group, an n-octadecyl group, an n-nonadecyl group, an n-icosyl group; a cyclopropyl group, a cyclopentyl group, a cyclohexyl group, a cycloheptyl group, a cyclooctyl group, a cyclodecyl group, a cycloundecyl group, a cyclododecyl group, a cyclotetradecyl group, a cyclooctadecyl group, a cycloicosyl group; a bicyclo[2.1.0] pentyl group, a bicyclo[3.2.1] octyl group, a bicyclo[5.2.0] nonyl group, a tricyclo[5.3.1.1] dodecyl group, a perhydroanthryl group, a spyro[3.4] octyl group, a spyro [4.5] decyl group, etc., and among them, those of a straight chained ones are preferable. However, at least one of $R_1$ to $R_4$ is an alkyl group having 8 to 18 carbon atoms, and at least one among them is a lower alkyl group having 1 to 3 carbon atoms. Specific examples of respective groups are appropriately chosen from those exemplified in the above, and preferred specific examples of the alkyl group having 8 to 18 carbon atoms include an n-decyl group, an n-undecyl group, an n-dodecyl group, etc., and among them an n-decyl group is preferable. Preferred specific examples of the lower alkyl group having 1 to 3 carbon atoms include a methyl group, an ethyl group, a propyl group, etc., and among them a methyl group is preferable.

In the general formula [1], the anion derived from a carboxylic acid having two or more carbon atoms shown $X^-$ is one derived from a carboxylic acid represented by the general formula [2]:

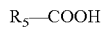         [2]

[wherein $R_5$ is a monovalent hydrocarbon group which may have a hydrogen atom or a substituent], or a dicarboxylic acid represented by the general formula [3],

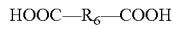         [3]

[wherein $R_6$ is a bivalent hydrocarbon group which may have a bond or a substituent].

In the general formula [2], a hydrocarbon group of the monovalent hydrocarbon group which may have a substituent shown by $R_5$ includes an aliphatic hydrocarbon group, an aromatic hydrocarbon group, and an aromatic-aliphatic hydrocarbon group, and it may have a sulfur atom in the chain of these groups.

The aliphatic hydrocarbon group includes, for example, an alkyl group, an alkenyl group, etc.

The alkyl group may be straight chained, branched, or cyclic, and it usually includes those having 1 to 20 carbon atoms, preferably 1 to 12 carbon atoms, and specifically includes a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, a neopentyl group, an n-hexyl group, an isohexyl group, a 3-methylpentyl group, a 2-methylpentyl group, a 1,2-dimethylbutyl group, an n-heptyl group, an isoheptyl group, a sec-heptyl group, an n-octyl group, an isooctyl group, a sec-octyl group, an n-nonyl group, an n-decyl group, an n-undecyl group, an n-dodecyl group, an n-tridecyl group, an n-tetradecyl group, an n-pentadecyl group, an n-hexadecyl group, an n-heptadecyl group, an n-octadecyl group, an n-nonadecyl group, an n-icosyl group; a cyclopropyl group, a cyclopentyl group, a cyclohexyl group, a cycloheptyl group, a cyclooctyl group, a cyclodecyl group, a cycloundecyl, a cyclododecyl group, a cyclotetradecyl group, a cyclooctadecyl group, a cycloicosyl group, etc.

The alkenyl group may be linear, branched, or cyclic, and it usually includes those having 2 to 20 carbon atoms, preferably 2 to 12 carbon atoms, and specifically includes a vinyl group, an allyl group, a 1-propenyl group, an isopropenyl group, a 3-butenyl group, a 2-butenyl group, a 1-butenyl group, a 1,3-butadienyl group, a 4-pentenyl group, a 3-pentenyl group, a 2-pentenyl group, a 1-pentenyl group, a 1,3-pentadienyl group, a 2,4-pentadienyl group, a 1,1-dimethyl-2-propenyl group, a 1-ethyl-2-propenyl group, a 1,2-dimethyl-1-propenyl group, a 1-methyl-1-butenyl group, a 5-hexenyl group, a 4-hexenyl group, a 3-hexenyl group, a 2-hexenyl group, a 1-hexenyl group, a 1-methyl-1-hexenyl group, a 2-methyl-2-hexenyl group, a 3-methyl-1,3-hexadienyl group, a 1-heptenyl group, a 2-octenyl group, a 3-nonenyl group, a 4-decenyl group, a 1-undecenyl group, a 2-dodecenyl group, a 3-tridecenyl group, a 4-tetradecenyl group, a 5-pentadecenyl group, a 6-hexadecenyl group, a 7-heptadecenyl group, a 3-octadecenyl group, a 1-nonadecenyl group, a 2-icocenyl group; a 1-cyclopropenyl group, a 2-cyclopentenyl group, a 2,4-cyclopentadienyl group, a 1-cyclohexenyl group, a 2-cyclohexenyl group, a 3-cyclohexenyl group, a 2-cycloheptenyl group, a 2-cyclononenyl group, a 3-cyclododecenyl group, a 3-cyclopentadecenyl group, a 2-cyclooctadecenyl group, a 2-cycloicocenyl group, etc.

The aromatic hydrocarbon group is preferably an aryl group, and specifically it usually includes those having 6 to 20 carbon atoms, preferably 6 to 14-carbon atoms, and specifically includes a phenyl group, a naphthyl group, an anthryl group, a 1-pyrenyl group, a perylenyl group, etc.

The aromatic-aliphatic hydrocarbon group is preferably an aralkyl group, and specifically is one those hydrogen atom of the above described alkyl group is substituted with an aromatic ring, and usually includes those having 7 to 13 carbon atoms, preferably 7 to 10 carbon atoms, and specifically includes a benzyl group, a phenethyl group, a phenylpropyl group, a phenylbutyl group, a phenylpentyl group, a phenylhexyl group, a phenyl-1-methylhexyl group, a phenyl-3-cyclopentyl group, etc.

A substituent of the monovalent hydrocarbon group which may have a substituent shown by $R_5$ includes, for example, a halogen atom such as a chlorine atom, a fluorine atom, a bromine atom and an iodine atom; a lower alkyl group such as a methyl group, an ethyl group, an n-propyl group, an isopropyl group, an n-butyl group, an isobutyl group, a sec-butyl group, a tert-butyl group; a halo lower alkyl group such as a fluoromethyl group, a difluoromethyl group, a trifluoromethyl group, a bromomethyl group, a tribromomethyl group, a chloromethyl group, a dichloromethyl group, a trichloromethyl group, a trifluoroethyl group, a tribromoethyl group, a trichloroethyl group, a pentafluoroethyl group, a pentabromoethyl group, a pentachloroethyl group, a heptafluoropropyl group, a heptabromopropyl group, a heptachloropropyl group; a lower alkoxyl group such as a methoxy group, an ethoxy group, a propoxy group, a butoxy group; an amino group, a nitro group, an oxo group, a hydroxyl group, a heterocyclic group, an aldehyde group, and among them, a halogen atom which have an electron-withdrawing property, a halo lower alkyl group, an alkyl group, and a nitro group are preferable.

The heterocyclic group includes those of 5- to 6-membered ring having 1 to 3 nitrogen atom, sulfur atom, and/or oxygen atom, and specifically includes a heterocyclic aliphatic group such as a 2-tetrahydrofuryl group, a 2-tetrahydrothienyl group, a 1-pyrrolidinyl group, a 2-pyrrolidinyl group, a 4-piperidinyl group, a 2-morpholinyl group; a heterocyclic aromatic group such as a 2-furyl group, a 2-thienyl group, a 1-pyrrolyl group, a 2-pyridyl group, a 3-pyridyl group, an isobenzofuranyl group, a chromenyl group, a 2H-pyrrolyl group, an imidazolyl group, a pyrazolyl group, a 5-pyrazolyl group, an indolizinyl group, an isoindolyl group, a 3H-indolyl group, an indolyl group, a 3-indolyl group, a 1H-indazolyl group, a purinyl group.

Specific examples of the compounds represented by the general formula [2] includes a saturated aliphatic monocarboxylic acid such as acetic acid, propionic acid, lactic acid, isolactic acid, valeric acid, isovaleric acid, pivalic acid, pentanoic acid, hexanoic acid, heptanoic acid, octanoic acid, nonanoic acid, decanoic acid, undecanoic acid, lauric acid, myristic acid, pentadecanoic acid, palmitic acid, heptadecanoic acid, stearic acid, nonadecanoic acid, eicosanoic acid; a aliphatic cyclic monocarboxylic acid such as cyclohexylcarboxylic acid; a halogenated alkyl monocarboxylic acid such as fluoroacetic acid, trifluoroacetic acid, chloroacetic acid, dichloroacetic acid, trichloroacetic acid, bromoacetic acid, iodoacetic acid, perfluoropropionic acid, perchloroheptanoic acid, perfluoroheptanoic acid, perfluorooctanoic acid, perfluorodecanoic acid, perfluorododecanoic acid, perfluoroeicosanoic acid, perfluorotetracosanoic acid; an aliphatic unsaturated monocarboxylic acid such as acrylic acid, propiolic acid, methacrylic acid, crotonic acid, isocrotonic acid, 4-hexenoic acid, oleic acid, elaidic acid; an alicyclic monocarboxylic acid such as camphoric acid, adamantanic acid; an aromatic monocarboxylic acid such as benzoic acid, naphthoic acid, anthracene carboxylic acid; an alkylated aromatic monocarboxylic acid such as toluic acid, a halogenated aromatic monocarboxylic acid such as fluorobenzoic acid, chlorobenzoic acid, bromobenzoic acid, difluorobenzoic acid, dichlorobenzoic acid, dibromobenzoic acid, trifluorobenzoic acid, trichlorobenzoic acid, tribromobenzoic acid, tetrafluorobenzoic acid, tetrachlorobenzoic acid, tetrabromobenzoic acid, pentafluorobenzoic acid, pentachlorobenzoic acid, pentabromobenzoic acid; a halogenated alkylated aromatic monocarboxylic acid such as trifluoromethylbenzoic acid, trichloromethylbenzoic acid, bis(trifluoromethyl)benzoic acid; a halogenated alkoxy aromatic monocarboxylic acid such as trifluoromethoxybenzoic acid, trichloromethoxybenzoic acid; a nitro aromatic monocarboxylic acid such as trinitrobenzoic acid; an aralkyl monocarboxylic acid such as 2-phenylpropanoic acid; an aralkylic acid such as hydroatropic acid; an arylalkenylic acid such as cinnamic acid, atropic acid; a hydroxyaliphatic monocarboxylic acid such as glycolic acid, lactic acid, glyceric acid; an aromatic hydroxyalkylmonocarboxylic acid such as benzylic acid, tropic acid; a hydroxyaromatic monocarboxylic acid such as salicylic acid, protocatechic acid, gallic acid, anisic acid, vanillic acid; an aliphatic ketone monocarboxylic acid such as pyruvic acid, acetoacetic acid; an amino acid such as alanine, arginine, asparagine, cysteine, glutamine, glycine, histidine, isoleucine, leucine, lysine, methionine, phenylalanine, proline, serine, threonine, tryptophan, tyrosine, valinee; a heterocyclic monocarboxylic acid, such as nicotinic acid, isonicotinic acid, furan carboxylic acid, thiophene carboxylic acid, 1-pyrrole carboxylic acid; p-formylphenyl acetic acid, 6-(2-naphthyl) hexanoic acid, etc.

In the general formula [3], a bivalent hydrocarbon group of the bivalent hydrocarbon group which may have a substituent shown by $R_6$, includes a bivalent aliphatic hydrocarbon group, a bivalent aromatic hydrocarbon group, a bivalent aromatic aliphatic hydrocarbon group.

The bivalent aliphatic hydrocarbon group includes, for example, an alkylene group, an alkenylene group, etc.

The alkylene group may be straight chained, branched, or cyclic, and it usually includes those having 1 to 10 carbon atoms, preferably 1 to 6, and specifically includes a methylene group, an ethylene group, a trimethylene group, a propylene group, a tetramethylene group, a butylene group, a 2-methylpropylene group, a pentamethylene group, a pentylene group, a 2-methyltetramethylene group, a 2,2-dimethyltrimethylene group, a 2-ethyltrimethylene group, a hexamethylene group, a hexylene group, a 2-methylpentamethylene group, a 3-methylpentamethylene group, a heptamethylene group, a heptylene group, an octamethylene group, an octylene group, a 2-ethylhexylene group, a nonamethylene group, a nonylene group, a decamethylene group, a decylene group; a cyclopropylene group, a cyclopentylene group, a cyclohexylene group, a cycloheptylene group, a cyclooctylene group, a cyclononylene group, a cyclodecylene group, etc.

The alkenylene group may be straight chained, branched, or cyclic, and it usually includes those having 2 to 10 carbon atoms, preferably 2 to 6 carbon atoms, and specifically includes a vinylene group, a propenylene group, a 1-butenylene group, a 2-butenylene group, a 1-pentenylene group, a 2-pentenylene group, a 2-methyl-1-propenylene group, a 2-methyl-1-butenylene group, a 1-methyl-1-butenylene group, a 1-hexenylene group, a 2-hexenylene group, a 3-hexenylene group, a 1-heptenylene group, a 2-heptenylene group, a 3-heptenylene group, a 1-octenylene group, a 2-octenylene group, a 3-octenylene group, a 4-propyl-2-pentenylene group, a 1-nonenylene group, a 2-nonenylene group, a 1-decenylene group a 4-cyclopentene-1,3-ylene group, a 3-cyclohexene-1,2-ylene group, etc.

The bivalent aromatic hydrocarbon group includes, for example, an arylene group.

The arylene group usually includes those having 6 to 10 carbon atoms, and specifically includes an o-phenylene group, an m-phenylene group, a p-phenylene group, a 1,5-naphthylene group, a 1,8-naphthylene group, a 2,7-naphthylene group, a 2,6-naphthylene group, etc.

The bivalent aromatic aliphatic group usually includes those having 7 to 12 carbon atoms, and specifically includes, for example, —$CH_2$—$C_6H_4$—, —$C_2H$—$C_6H_4$—, —CH($CH_3$)—$C_6H_4$—, —$CH_2$—$C_6H_4$—$CH_2$—, —CH($CH_3$)—$C_6H_4$—$C_2H_4$—, —$C_3H_6$—$C_6H_4$—$CH_2$—, —$C_3H_6$—$C_6H_4$—$C_2H_4$—, —$C_3H_6$—$C_6H_4$—$C_3H_6$—, —$CH_2CH(CH_3)$—$C_6H_4$—$C_2H_4$—, etc.

A substituent of the bivalent hydrocarbon group which may have a substituent shown by $R_6$ includes the same substituent as the above described substituent of the monovalent aliphatic hydrocarbon group which may have a substituent shown by $R_5$.

Specific examples of the compounds represented by the general formula [3] includes, for example, a aliphatic saturated dicarboxylic acid such as oxalic acid, malonic acid, succinic acid, glutaric acid, adipic acid, pimelic acid, suberic acid, azelaic acid, sebacic acid; an aliphatic unsaturated dicarboxylic acid such as 4-propyl-2-pentene diacid, maleic acid, fumaric acid, citraconic acid, mesaconic acid; an aromatic dicarboxylic acid such as phthalic acid, isophthalic acid, terephthalic acid, 1,5-naphthalene dicarboxylic acid; a hydroxyaliphatic dicarboxylic acid such as tartronic acid, malic acid, tartaric acid; an amino acid such as asparagic acid, cysteine, glutamic acid; a hetrocyclic dicarboxylic acid such as 2,3-quinoline diacetic acid.

A quaternary ammonium salt which can be used for the purpose of the present invention has such properties as that it basically should hardly have absorption in the measurement wavelength range (300 to 900 nm) at the concentration in use, should be soluble to water and/or a surface active agent, and should be free from precipitation or clouding with other cleaner components, should not attack glass, plastics, metals, etc., should maintain stable quality for a long time and should be capable of preventing the generation of algae and growth of microorganisms (bacteria etc.) at a low effective concentration.

The specific examples thereof include dialkyldimethylammonium adipate, dialkyldimethylammonium propionate, etc., and especially dialkyldimethylammonium adipate is preferable, and among them, didecyldimethylammonium adipate is preferable.

As these, commercially available one is used as it is. For example, didecyldimethylammonium adipate is commercially available in the name of OSMORIN DA-50 (Sanyo Chemical Industries, Ltd. Trade name).

The quaternary ammonium salt represented by the general formula [1] may be used alone or in combination of at least two thereof. The usage amount may correspond to a concentration which is effective for preventing the generation of algae and growth of microorganisms (bacteria etc.) and has no adverse effects on the measurement, and they are added in the cleaner such that the total concentration in the thermostatic water bath may be 0.001 to 0.1 w/w %, preferably 0.005 to 0.05 w/w %. A concentration thereof in the cleaner may be determined by considering to what extent it being diluted when it is added in water of the thermostatic water bath, and is usually used alone or in combination of at least two sorts thereof such that it is about 1 to 10 w/w %, preferably 3 to 8 w/w %.

In the same way as the quaternary ammonium salt which can be used in the present invention, the preservative agent having amphoteric surface activity which is used in the thermostatic water bath according to the present invention is desired to have such properties that it should hardly have absorption in the measurement wavelength range (300 to 900 nm) at the concentration in use, should be soluble to water and/or a surface active agent, should be free from precipitation or clouding with other components in a cleaner, should not attack glass, plastics, metals, etc., should maintain stable quality for a long time and should be capable of preventing the generation of algae and growth of microorganisms (bacteria etc.) at a low effective concentration.

Specific examples thereof include N-bis(3-aminopropyl) dodecyl amine, 3-aminopropyl-dodecylpropane diamine, 1,3-propanediamine-N-3-aminopropyl-N-dodecyl, alkylaminoglycine, alkyldiaminoethylglycine hydrochloride, alkylaminoethylaminoethylglycine, alkylaminopropylaminoacetic acid, alkylpolyaminoethylglycine, etc. Among them, N-bis(3-aminopropyl)dodecylamine, 3-aminopropyl-dodecylpropane diamine, and 1,3-propane diamine-3-aminopropyl-N-dodecyl, which have a structure of

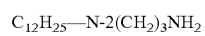

$$C_{12}H_{25}-N-2(CH_2)_3NH_2$$

and especially, N-bis(3-aminopropyl)dodecylamine is preferable.

As these, commercially available one is used as it is. For example, it is commercially available in the name of N-bis(3-aminopropyl)dodecyl amine, Lonzabac 12.100 (Lonzabac 12.100, Lonza Co. Japan: Trade name), etc.

The preservative agent may be used alone or in combination of at least two sorts thereof. The amount used may correspond to a concentration, which is effective for preventing the generation of algae and growth of microorganisms (bacteria etc.) and has no adverse effects on the measurement, and they are added in a cleaner such that the total concentration in the thermostatic water bath may be 0.0005 to 0.02 w/w %, preferably 0.001 to 0.01 w/w %. A concentration thereof in the cleaner may be determined by considering to what-extent it being diluted when it is added in water of the thermostatic water bath, and is usually used alone or in combination of at least two sorts thereof such that it is about 0.05 to 10 w/w %, preferably 1 to 5 w/w %.

As for the surface active agent used in the thermostatic water bath in the present invention, any one may substantially be used so long as it has no adverse effects on the measurement and can prevent attachment of air bubbles to the reaction vessel. More stringently, any surface active agent may be used without any particular limitation so long as it does not contain any water-insoluble substance, has poor bubble-formation property, has such high clouding point so that it is transparent even at the reaction temperature (37° C.), does not react or precipitate with a quaternary ammonium salt represented by in the general formula [1] or a preservative agent having amphoteric surface activity according to the present invention, has substantially no absorption in a wavelength range of 300 to 900 nm, has no adverse effects on glass, metals, plastics, etc., as the materials of the thermostatic water bath and the reaction vessel of the automatic analyzer, and is stable in quality, is free from hazardousness and is easy to handle.

For instance, any of a nonionic surface active agent, a cationic surface active agent, an anionic surface active agent, and an amphoteric surface active agent may be used. The nonionic surface active agent includes, for example, polyoxyethylene alkyl ether, polyoxyethylene alkylphenyl ether, polyoxyethylene fatty acid ester, polyoxyethylene sorbitan fatty acid ester, sorbitan fatty acid ester, polyoxyethylene sorbitol fatty acid ester, polyoxyethylene alkylamine, glycerin fatty acid ester, alkanol amide of fatty acid, sucrose fatty acid ester, etc. The cationic surface active agent includes, for example, an aliphatic amine salt, an aliphatic quartemary ammonium salt, etc. The anionic surface active agent includes, for example, a carboxylic acid salt, a sulfonic acid salt, a sulfuric ester salt, a phosphoric ester salt, etc.; and an amphoteric surface active agent includes, for example, carboxy-betaines, sulfo-betaines, glycines, alanines, derivatives of 2-alkylimidazoline, amine oxides, etc.

Further, specific examples of the polyoxyethylene alkyl ether, which is a nonionic surface active agent, include, polyoxyethylene cetyl ether, a polyoxyethylene stearyl ether, a polyoxyethylene oleyl ether, etc.; specific examples of thepolyoxyethylene alkylphenyl ether include thepolyoxyethylene octylphenyl ether, thepolyoxyethylene nonylphenyl ether, etc.; specific examples of thepolyoxyethylene fatty acid ester include thepolyoxyethylene glycol monolaurate, thepolyoxyethylene glycol monostearate, thepolyoxyethylene glycol distearate, polyoxyethylene glycol monooleate, etc.; specific examples of the polyoxyethylene sorbitan fatty acid ester include polyoxyethylene sorbitan monolaurate, polyoxyethylene sorbitan monopalmitate, polyoxyethylene sorbitan monostearate, polyoxyethylene sorbitan tristearate, polyoxyethylene sorbitan monooleate, polyoxyethylene sorbitan trioleate, etc.; specific examples of the sorbitan fatty acid ester include sorbitan monolaurate, sorbitan monopalmitate, sorbitan monostearate, sorbitan distearate, sorbitan tristearate, sorbitan monooleate, sorbitan trioleate, sorbitan sesquioleate, etc.; specific examples of the polyoxyethylene sorbitol fatty acid ester include polyoxyethylene sorbitol tetraoleate, etc.; specific examples of the polyoxyethylene alkylamine, include polyoxyethylene laurylamine, polyoxyethylene stearylamine, etc.; specific examples of the fatty acid ester of glycerin include stearic acid monoglyceride, oleic acid monoglyceride, etc.; specific examples of the alkanol amide of fatty acid include diethanolamide of a lauric acid, etc.; specific examples of the sucrose fatty acid ester include sucrose palmitic acid ester, sucrose stearic acid ester, etc.

The aliphatic amine salt, which is a cationic surface active agent, includes salts of a higher aliphatic amine such as a monolaurylamine, a mono stearylamine, a distearylamine, a tristearylamine, with an inorganic acid such as a hydrochloric acid, a sulfuric acid, or a lower carboxylic acid such as an acetic acid, a lactic acid, a citric acid, and specifically, it includes an acetic acid salt of laurylamine, an acetic acid salt of stearylamine, etc. The quartemary aliphatic ammonium salt includes salts of a higher aliphatic ammonium such as lauryltrimethylammonium, stearyltrimethylammonium, cetyltrimethylammonium, didecyldimethylammonium, benzyldimethyltetradecylammonium, with chlorine, bromine, and specifically, it includes lauryltrimethylammonium chloride, stearyltrimethylammonium chloride, cetyltrimethylammonium chloride, didecyldimethylammonium chloride, benzyldimethyltetradecylammonium chloride, etc.

The carboxylic acid salt, which is the anionic surface active agent, includes salts of a higher aliphatic acid such as a lauryic acid, a myristic acid, a palmitic acid, a stearic acid, an oleic acid, with an alkaline metal such as sodium, potassium, and specifically, it includes potassium oleate, sodium lauroyl sarcosinate, sodium N-myristoyl-N-methyl-β-alanine, sodium polyoxyethylene lauryl ether acetate, etc. The sulfonic acid salt includes salts of an alkylbenzenesulfonic acid such as a laurylbenzenesulfonic acid, a naphthalenesulfonic acid such as a dipropylnaphthalenesulfonic acid, a dibutylnaphthalenesulfonic acid, a sulfosuccinic acid such as a dioctylsulfosuccinic acid, with sodium, etc., and specifically, it includes, for example, sodium laurylbenzenesulfonate, sodium dipropylnaphthalenesulfonate, sodium dibutylnaphthalenesulfonate, sodium dioctylsulfosuccinate, etc. The sulfuric ester salt includes salts of higher alcohol sulfuric, acid ester such as laurylsulfuric ester, etc., polyoxyethylene alkyl ether sulfric acid such as polyoxyethylene lauryl ether sulfuric acid, etc., with sodium, ammonium, etc., and specifically, it includes salts of higher alcohol sulfuric acid ester such as sodium laurylsulfate, ammonium laurylsulfate, salts of polyoxyethylene alkyl ether sulfuric acid such as sodium polyoxyethylene lauryl ether sulfate. The phosphoric acid ester salt includes salts of a monostearylphosphoric ester, a monolaurylphosphoric ester, a polyoxyethylene lauryl ether phosphate, etc., with an alkaline metal such as sodium, potassium, and specifically, it includes sodium monostearylphosphate, sodium monolauryphosphate, potassium polyoxyethylene lauryl ether phosphate, etc.

Specific examples of the carboxybetaines, which are an amphoteric surface active agent, include lauric amide propylbetain, lauryldimethylaminoacetic acid betain, sodium N-lauroyl-N'-carboxymethyl-N'-hydroxyethylethylenediamine, etc. Specific examples of the sulfobetaines include lauric acid amide propylhydroxy sulfobetain, etc. Specific examples of the glycines include sodium lauryldiaminoethylglycinate, etc. Specific examples of derivatives of 2-alkylimidazoline include 2-alkyl-N-carboxymethyl-N-hydroxyethylimidazolinium betain such as 2-lauroyl-N-carboxymethyl-N-hydroxyethylimidazolinium betain. Specific examples of amine oxides include lauryldimethylamine oxide, etc.

Preferable specific examples of these surface active agents include polyoxyethylene alkyl ether, sodium lauroyl sarcosinate, etc., and a combined use of these is more preferable.

As for these surface active agents commercially available one is used as it is. For example, a polyoxyethylene alkyl ether is commercially available in the name of BT-9 (Nikko Chemical Co. Ltd., Japan: Trade name), etc., and sodium lauroylsarcosinate in the name of Sarcosinate LN (Nikko Chemical Co. Ltd., Japan: Trade name), etc.

These surface active agents may be used alone or in combination of at least two sorts thereof. The amount used may correspond to a concentration, which has no adverse effects on the measurement, and they are added in the cleaner such that the total concentration in the thermostatic water bath is 0.005 to 1.0 w/w %, preferably 0.01 to 0.5 w/w %. A concentration thereof in the cleaner may be determined by considering to what extent it is diluted when it is added in water of the thermostatic water bath, and it is usually used alone or in combination of at least two sorts thereof such that it is about 1 to 20 w/w %, preferably 5 to 10 w/w %.

The cleaner for a thermostatic water bath according to the present invention may contain predetermined concentrations of the quaternary ammonium salt according to the present invention or the preservative agent having amphoteric surface activity, and the surface active agent according to the present invention, and it is more preferable that both of them are made to coexist since the quaternary ammonium salt has antimicrobial effect, and a preservative agent having amphoteric surface activity has higher germicidal effect.

The cleaner for the thermostatic water bath according to the present invention is mainly added to a thermostatic water bath of an automatic analyzer, and usually it is added to the thermostatic water bath via a small-diameter plastic tube. Therefore, if the solution of the cleaner has an excessive viscosity or is clouded, it is liable that a predetermined amount of a cleaner cannot be added to the thermostatic water bath or the plastic tube for transfer is clogged, which are practical problems. For the above reasons, the cleaner solution desirably has a viscosity of 6 centistokes (cSt) or below and is transparent.

Further, it is optional, so long as the purpose of the present invention is not spoiled, to add to the cleaner for a thermostatic water bath according to the present invention, chelating agents, pH controllers, and for example, stabilizers such as beta-thiodiglycol.

Chelating agents contained as needed in the cleaner for a thermostatic water bath according to the present invention may be one which forms a complex compound with metallic impurity and is not especially limited. Specifically, it includes a compound having at least one carboxyl group in a molecule, a compound having at least one phosphonic acid group in a molecule, N-substituted amino acids, condensed phosphoric acids, and ammonium salts or alkali metallic salts thereof.

The compound having at least one carboxyl group in a molecule is preferably nitrogen-containing polycarboxylic acid containing 1 to 4 nitrogen atoms and 2 to 6 carboxyl groups in the molecule. Specifically, it includes an alkyliminopolycarboxylic acid which may have a hydroxyl group, such as hydroxyethyliminodiacetic acid [HIDA], and iminodiacetic acid [IDA]; nitrilo-polycarboxylic acid such as nitrilotriacetic acid [NTA], and nitrilotripropionic acid [NTP]; a mono- or polyalkylenepolyamine polycarboxylic acid, which may have a hydroxyalkyl group, a hydroxyaryl group or a hydroxyaralkyl group, such as ethylenediaminetetraacetic acid [EDTA], ethylenediaminediacetic acid [EDDA], dihydrochloric acid salt of ethylenediaminedipropionic acid [EDDP], hydroxyethylethylenediaminetriacetic acid [EDTA-OH], 1,6-hexamethylenediamine-N,N,N',N'-tetraacetic acid [HDTA], triethylenetetraminehexaacetic acid [TTHA], diethylenetriamine-N,N,N',N'', N''-pentaacetic acid [DTPA], and N,N-bis(2-hydroxybenzyl)ethylenediamine-N, N-diacetic acid [HBED]; a polyaminoalkanepolycarboxylic acid such as diaminopropanetetraacetic acid [Methyl-EDTA], and trans-1,2-diaminocyclohexane-N,N,N',N'-tetraacetic acid [CyDTA]; a polyaminoalkanolpolycarboxylic acid such as diaminopropanoltetraacetic acid [DPTA-OH]; a hydroxyalkyletherpolyaminepolycarboxylic acid such as glycoletherdiaminetetraacetic acid [GEDTA], etc.

The compound having at least one phosphonic acid group in a molecule, includes nitrogen-containing poly phosphonic acids, which have 1 to 6 nitrogen atoms and 1 to 8 phosphonic acid groups in a molecule, such as alkylaminopoly(alkylphosphonic acid), a mono- or polyalkylenepolyaminepoly(alkylphosphonic acid), nitrilopoly(alkylphosphonic acid); arylphosphonic acid, alkylenepolyphosphonic acid, alkanpolyphosphonic acid which may have a hydroxyl group, etc.

Specific examples of the compound having at least one phosphonic acid group in a molecule, include an alkylaminopoly(alkylphosphonic acid) such as ethylaminobis(methylenephosphonic acid) and dodecylaminobis(methylenephosphonic acid);

a mono- or polyalkylenepolyaminepoly(alkylphosphonic acid) such as ethylenediaminebis(methylenphosphonic acid) [EDDPO], ethylenediaminetetrakis(ethylenphosphonic acid), ethylenediaminetetrakis (methylenphosphonic acid) [EDTPO], hexamethylenediaminetetrakis (methylenphosphonic acid), isopropylenediaminebis(methylenphosphonic acid), isopropylenediaminetetra(methylenphosphonic acid), propanediaminetetra(ethylenphosphonic acid) [PDTMP], diaminopropanetetra(methylenphosphonic acid) [PDTPO], diethylenetriaminepenta(ethylenphosphonic acid) [DEPPO], diethylenetriaminepenta(methylenphosphonic acid) [DETPPO], triethylenetetraminehexa(ethylenphosphonic acid) [TETHP], and triethylenetetraminehexa(methylenphosphonic acid) [TTHPO]; a nitrilopoly(alkylphosphonic acid) such as nitrilotris(methylenephosphonic acid) [NTPO]; an arylphosphonic acid such as phenylphosphonic acid; an alkylenepolyphosphonic acid such as alkylenediphosphonic acid (methylenediphosphonic acid); an alkanpolyphosphonic acid such as alkandiphosphonic acid, which may have a hydroxyl group (ethylidenediphosphonic acid, 1-hydroxyethylidene-1, 1'-diphosphonic acid [HEDPO], 1-hydroxypropylidene-1,1'-diphosphonic acid, 1-hydroxybutylidene-1,1'-diphosphonic acid, etc.), etc.

The N-substituted amino acids include dihydroxyethylglycine [DHEG], N-acethylglycine, etc., and condensed phosphoric acids include tripolyphosphoric acid, hexamethaphosphoric acid, etc., respectively.

Among these chelating agents, EDTA, especially an alkaline metallic salt thereof, and above all, tetra sodium salts thereof (tetrasodium ethylenediaminetetraacetate: EDTA4Na) are preferable.

The chelating agents may be used alone or in combination of at least two sorts thereof. The amount used may correspond to a concentration, which has no adverse effects on the measurement, and they are added in a cleaner such that the total concentration in the thermostatic water bath is 0.00001 to 0.0001 w/w %, preferably 0.00002 to 0.00005 w/w %. A concentration thereof in the cleaner may be determined by considering to what extent it being diluted when it is added in water of the thermostatic water bath, and is usually used alone or in combination of at least two sorts thereof such that it is about 0.001 to 0.1 w/w %, preferably 0.01 to 0.05 w/w %.

It should be noted that a liquid property of water in the thermostatic water bath on use, after a cleaner for a thermostatic water bath according to the present invention is added, is preferred to be alkaline for the purpose of preventing of slime of water and preventing generation of saprolegnia. For example, pH is preferably 8 to 14, especially preferably 9 to 12.

Therefore, a reagent that makes a liquid property alkaline, such as sodium hydroxide, potassium hydroxide, is preferably added into a cleaner for a thermostatic water bath according to the present invention. On this occasion, an amount of an alkaline reagent, which is added to a cleaner for a thermostatic water bath, may be to the extent that a liquid property of the cleaner itself for a thermostatic water bath may be 8 to 14, preferably 9 to 12.

As a method for cleaning a thermostatic water bath according to the present invention, the cleaner for the thermostatic water bath according to the present invention may be added to water in the thermostatic water bath to a concentration, which is effective for preventing the generation of algae and growth of fungus (bacteria etc.) and has no adverse effects on the measurement.

For example, the cleaner for a thermostatic water bath according to the present invention may be used by usually diluting in the thermostatic water bath as a concentration of the quaternary ammonium salt totally to 0.001 to 0.1 w/w %, preferably 0.005 to 0.05 w/w %, a concentration of the preservative agent having amphoteric surface activity totally to 0.0005 to 0.02 w/w %, preferably 0.001 to 0.01 w/w %, a concentration of the surface active agent totally to 0.005 to 1.0 w/w %, preferably 0.01 to 0.5 w/w %, a concentration of the chelating agent which is contained if necessary, totally to 0.00001 to 0.0001 w/w %, preferably 0.00002 to 0.00005 w/w % in water of the thermostatic water bath.

As for the method, a cleaner for a thermostatic water bath according to the present invention, wherein, for instance, a concentration of the quaternary ammonium salt totally to 1 to 10 w/w %, preferably 3 to 8 w/w %, a concentration of the preservative agent having amphoteric surface activity totally to 0.05 to 10 w/w %, preferably 1 to 5 w/w %, a concentration of the surface active agent totally to 1 to 20 w/w %, preferably 5 to 10 w/w %, a concentration of the chelating agent, which is contained if necessary, totally to 0.001 to 0.1 w/w %, preferably 0.01 to 0.05 w/w %, have already been adjusted, may be used by adding it in water of the thermostatic water bath to become 100 to 1000 times of dilution.

Otherwise, in water of the thermostatic water bath, each of reagents may be added respectively to become each of the above described concentrations.

It should be noted that, pH of water in the thermostatic water bath is preferably 8 to 14 of alkaline, more preferably 9 to 12 of alkaline. Therefore, a reagent, which makes a liquid property alkaline, is made to be preliminarily contained in a cleaner for a thermostatic water bath according to the present invention, and when the cleaner for a thermostatic water bath is added in water of the thermostatic water bath, it may be enough that a liquid property of water of the thermostatic water bath is made to be adjusted to the aimed pH. Or after adding to water of the thermostatic water bath, the quaternary ammonium salt, and/or the preservative agent having ampho-teric surface activity, the surface active agent, and the chelating agent which is contained if necessary, such that concentration of each agent become the above described concentrations, a liquid property of water of the thermostatic water bath may be made to be adjusted to the aimed pH by adding the reagent which makes a liquid property alkaline to water of the thermostatic water bath.

was sterilized with high pressure steam and preserved at 50° C.±2° C., was added into the petri dish, and it was solidified to obtain an agar plate medium.

(3) Evaluation Method of Antimicrobial Activity

The individual test microorganism, which was preliminarily cultured in bouillon medium in advance until $1\times10^8$ microorganisms/mL, was diluted with sterilized physiological saline for 100 times (to $1\times10^6$ microorganisms/mL). Next, prepared solution of the test microorganism was smeared with a platinum loop on the surface of the agar plate medium prepared in (2), and the medium was cultured at 35° C.±2° C., for 24 hours.

After the cultivation, confirming the presence or not of growth of the microorganism on the surface of the medium was conducted, a minimum concentration of the agent, where growth of the microorganisms cannot be recognized, was determined as the minimum inhibitory concentration (MIC, μg/mL) of the agent.

(4) Result

The results are shown in Table 1.

Abbreviation of each microorganism as shown in Table 1 is respectively as follows,

TABLE 1

| Agent | Minimum Inhibitory Concentration (μg/mL) | | | | | | | | |
|---|---|---|---|---|---|---|---|---|---|
|  | B.s | E.c | P.a | S.a | A.n | C.g | Cl.cl | P.c | T.v |
| DDAA | <1.563 | 100 | 400 | <1.563 | 400 | 200 | 100 | 400 | 200 |
| TAA | 3.125 | 50 | 100 | 3.125 | 200 | 100 | 25 | 200 | 50 |
| BC | <1.563 | 100 | 800 | 6.25 | 1,600 | 400 | 200 | 800 | 400 |

Now, the invention will be described in further detail referring to examples without any restriction.

EXAMPLES

Experiment 1

Study of Antimicrobial Activity (1) Agent and Test Microorganism

1) Agent

Didecyldimethylammonium adipate (DDAA), N-bis(3-aminopropyl)dodecylamine (TAA) and benzalkonium chloride (BC) were used.

2) Test Microorganism

*Bacillus subtilis* (NBRC13719), *Escherichia coli* (NBRC3972), *Pseudonas aeruginosa* (NBRC12689), *Staphylococcus aureus* (NBRC12732), *Aspergillus niger* (NBRC6341), *Chaetomium globosum* (NBRC6347), *Cladosporium cladosporioides* (NBRC6348), *Penicillium citrinum* (NBRC6352), and *Trichoderma viride* (NBRC31831) were used.

(2) Preparation of Culture Medium

In a sterilized petri dish having a diameter of 90 mm, an aqueous solution which was obtained by diluting each of agents with distilled water such that a concentration of the agent become each predetermined concentrations when the solution is prepared to a total volume of 20 mL, and then sterilized water was added into the petri dish such that a total volume of sterilized water and the agent aqueous solution become 2 mL. Further, 18 mL of nutrient agar medium, which As is clear from the results of Table 1, it is found that DDAA and TAA have higher antimicrobial activity than BC concerning all tested kinds of microorganisms.

Experiment 2

Study of Antimicrobial Activity in the Presence of Proteins (1) Agent and Test Microorganism 1) Agent Didecyldimethylammonium adipate (DDAA), N-bis(3-aminopropyl)dodecylamine (TAA) and benzalkonium chloride were used.

2) Reagent Solution

GOT (glutamic-oxaloacetic transaminase) solution: GOT Substrate-Enzyme solution and GOT-2α•KG solution which were components of L type Wako GOT•J2 kit (produced by Wako Pure Chemical Industries, Ltd.) were prepared with distilled water so as to become a 0.2 w/w % aqueous solution.

GPT (glutamic-pyruvic transaminase) solution: GOT Substrate-Enzyme solution and GOT•2α-KG solution which were components of L type Wako GPT•J2 kit (produced by Wako Pure Chemical Industries, Ltd.) were prepared with distilled water so as to become a 0.2 w/w % aqueous solution.

Serum: Control Serum II Wako (produced by Wako Pure Chemical Industries, Ltd.) was prepared with distilled water so as to become a 0.2 w/w % aqueous solution with distilled water.

3) Test Microorganism

*Bacillus subtilis* (NBRC13719), *Escherichia coli* (NBRC3972), *Pseudonas aeruginosa* (NBRC12689), and *Staphylococcus aureus* (NBRC12732) were used.

(2) Preparation of Culture Medium

In a sterilized petri dish having a diameter of 90 mm, an aqueous solution which was obtained by diluting each of agents with distilled water was added such that a concentration of the agent become each predetermined concentrations when the solution is prepared to a total volume of 20 mL, and the agent aqueous solution and a reagent solution such that a final concentration of each of components (GOT, GPT, and serum) in the reagent become 100 μg/mL when the solution is prepared to a total volume of 20 mL. And then, sterilized water was added into the petri dish such that a total volume of sterilized water and the agent aqueous solution become 2 mL. Further, 18 mL of nutrient agar medium, which was sterilized with high pressure steam and preserved at 50° C.±2° C., was added into the petri dish, and it was solidified to obtain an agar plate medium. Furthermore, as a reference, agar plate medium obtained by using pure water instead of the agent solution was also prepared.

(3) Evaluation Method of Antimicrobial Activity

The individual test microorganisms, which was preliminarily cultured in bouillon medium in advance until $1 \times 10^8$ microorganisms/mL, was diluted with sterilized physiological saline for 100 times (to $1 \times 10^6$ microorganisms/mL). Next, the prepared solution of the test microorganisms was smeared with a platinum loop on the surface of the agar plate medium prepared in (2), and the medium was cultured at 35° C.±2° C. for 24 hours.

After the cultivation, confirming the presence or not of the growth of the microorganism on the surface of the medium was conducted, a minimum concentration of the agent, where growth of the microorganisms cannot be recognized, was determine as the minimum inhibitory concentration (MIC, μg/mL) of the agent.

(4) Result

The results are shown in Table 2.

Abbreviation of each microorganism as shown in Table 2 is respectively as follows,

TABLE 2

| Protein | Agent | Minimum Inhibitory Concentration (μg/mL) | | | |
|---|---|---|---|---|---|
| | | B.s | B.c | P.a | S.a |
| Pure Water | DDAA | <1 | 50 | 200 | <1 |
| | TAA | 10 | 50 | 10 | 10 |
| | BC | 10 | 100 | >200 | <1 |
| GOT | DDAA | <1 | 50 | 200 | <1 |
| | TAA | 10 | 50 | 100 | 10 |
| | BC | 10 | 200 | >200 | <1 |
| GPT | DDAA | <1 | 50 | 200 | <1 |
| | TAA | 10 | 50 | 100 | 10 |
| | BC | 10 | 200 | >200 | 50 |
| Serum | DDAA | <1 | 50 | 200 | <1 |
| | TAA | 10 | 50 | 100 | 10 |
| | BC | 10 | 200 | >200 | <1 |

As is clear from Table 2, it is found that DDAA and TAA do not show any reduction of antimicrobial activity to each of microorganisms even in a condition of the presence of the protein such as enzymes and serum, and therefore, these are preferable for using in the cleaner for a thermostatic water bath.

On the other hand, it is found that BC shows reduction of antimicrobial activity in the presence of the protein, and therefore, it is not preferable for using as the cleaner for a thermostatic water bath.

Experiment 3

Study of Germicidal Activity (1) Agents and Test Fungus

1) Agents

Didecyldimethylammonium adipate (DDAA), N-bis(3-aminopropyl)dodecylamine (TAA) and benzalkonium chloride were respectively prepared such that a concentration thereof is 1 w/w %.

2) Reagent Solutions

GOT solution: GOT Substrate-Enzyme solution and GOT•L2α-KG solution which were components of L type Wako GOT•J2 kit (produced by Wako Pure Chemical Industries, Ltd.) were prepared with distilled water so as to become a 0.1 w/w % aqueous solution.

GPT solution: GOT Substrate-Enzyme solution and GOT•L2α-KG solution which were components of L type Wako GPT•J2 kit (produced by Wako Pure Chemical Industries, Ltd.) were prepared with distilled water so as to become a 0.1 w/w % aqueous solution.

Serum: Control Serum II Wako (produced by Wako Pure Chemical Industries, Ltd.) was prepared with distilled water so as to become a 0.1 w/w % aqueous solution.

3) Test Microorganism

*Bacillus subtilis* (NBRC13719), *Escherichia coli* (NBRC3972), *Pseudonas aeruginosa* (NBRC12689), and *Staphylococcus aureus* (NBRC12732) were used.

(2) Evaluation Method of Germicidal Activity i) The individual test microorganism, which was preliminarily cultured in bouillon medium in advance until $1 \times 10^8$ microorganisms/mL, were diluted with sterilized physiological saline for 100 times (to $1 \times 10^6$ microorganisms/mL) to obtain a solution of test microorganisms.

ii) Into a 20 mL test tube made of glass which was preliminarily sterilized by dry-heat sterilization, the agent aqueous solution, the reagent solution and the solution of test microorganisms as prepared in the above described i) were added such that a final concentration of the agent become 50 μg/mL, a final concentration of the reagent become 100 μg/mL, and the number of test microorganisms become $1 \times 10^5$ microorganisms/mL, respectively, when a total volume thereof is prepared to be 10 mL. And then, the tube was sufficiently stirred.

iii) After a lapse of predetermined times (5 min, 10 min, and 15 min), the solution as obtained in the above described ii) was smeared with a platinum loop on the surface of the nutrient agar plate medium preliminarily having been prepared, and the medium was cultured at 35° C.±2° C. for 24 hours.

iv) After the cultivation, confirming the presence or not of the growth of the microorganisms on the surface of the medium was conducted.

(3) Result

The results are shown in Table 3.

In Table 3, a case where growth of the microorganism on the surface of the medium was recognized is shown by +, and a case where growth of the microorganism on the surface of the medium was not recognized is shown by −, respectively.

Abbreviation of each microorganisms shown in Table 3 is as described in Experiment 2.

TABLE 3

| Protein | Agent | Time (min) | B.s | E.c | P.a | S.a |
|---------|-------|------------|-----|-----|-----|-----|
| GOT | DDAA | 5 | + | + | − | − |
| | | 10 | + | + | − | − |
| | | 15 | + | + | − | − |
| | TAA | 5 | + | + | − | − |
| | | 10 | + | + | − | − |
| | | 15 | + | + | − | − |
| | BC | 5 | + | + | + | − |
| | | 10 | + | + | + | − |
| | | 15 | + | + | + | − |
| GPT | DDAA | 5 | + | + | − | − |
| | | 10 | + | + | − | − |
| | | 15 | + | + | − | − |
| | TAA | 5 | + | + | − | − |
| | | 10 | + | + | − | − |
| | | 15 | + | + | − | − |
| | BC | 5 | + | + | + | − |
| | | 10 | + | + | + | − |
| | | 15 | + | + | + | − |
| Serum | DDAA | 5 | + | + | − | − |
| | | 10 | + | + | − | − |
| | | 15 | + | + | − | − |
| | TAA | 5 | + | + | − | − |
| | | 10 | + | + | − | − |
| | | 15 | + | + | − | − |
| | BC | 5 | + | + | + | + |
| | | 10 | + | + | + | + |
| | | 15 | + | + | + | + |

As is clear from Table 3, it is found that DDAA and TAA has, as compared with BC, high germicidal activity to microorganisms which cause nosocomial infection such as *Pseudonas aeruginous* (P.a), *Staphylococcus aureus* (S.a), even in a condition of the presence of the protein such as an enzyme, serum. Further, although data are not shown, TAA, which is the preservative agent having amphoteric surface activity, shows high germicidal activity to *Pseudonas aeruginous* and *Staphylococcus aureus*, and the effect do not change even in the condition of the presence of the protein such as an enzyme, serum.

Example 1

Study of Germicidal Activity of the Cleaner for a Thermostatic Water Bath According to the Present Invention From the results of Experiments 1 to 3, it was found that didecyldimethylammonium adipate and N-bis(3-aminopropyl)dodecylamine have excellent antimicrobial activity and germicidal activity. Therefore, the cleaner for a thermostatic water bath containing these was prepared. And germicidal activity to various kinds of microorganisms was compared between the cleaner for a thermostatic water bath according to the present invention and the conventional cleaner for a thermostatic water bath.

(1) Preparation of the Cleaner for a Thermostatic Water Bath According to the Present Invention Such that didecyldimethylammonium adipate is 5.6 w/w %, N-bis(3-aminopropyl)dodecylamine 2.4 w/w %, EDTA4Na 0.02 w/w %, polyoxyethylene alkyl ether 4.5 w/w %, and sodium lauroylsarcosinate 0.5 w/w %, the respective components were dissolved in pure water, and then, pH of the solution was adjusted to 11.4 with an sodium hydroxide solution. The solution was used as the cleaner for a thermostatic water bath according to the present invention.

(2) Preparation of the Conventional Cleaner for a Thermostatic Water Bath

Such that polyoxyethylene nonylphenyl ether, monoethenolamine and distilled water were in a weight ratio of 20:5:5:70, the respective components were mixed, and the mixture was used as the conventional cleaner for a thermostatic water bath.

(3) Test Microorganisms

*Bacillus subtilis* (NBRC13719), *Escherichia coli* (NBRC3972), *Pseudonas aeruginosa* (NBRC12689), and *Staphylococcus aureus* (NBRC12732) were used.

(4) Evaluation Method of Germicidal Activity i) The individual test microorganism, which was preliminarily cultured in bouillon medium in advance until $1 \times 10^8$ microorganisms/mL, was diluted with sterilized physiological saline for 100 times (to $1 \times 10^6$ microorganisms/mL) to obtain a solution of test microorganisms.

ii) Into a 20 mL test tube made of glass which was preliminarily sterilized by dry-heat sterilization, the cleaner for a thermostatic water bath according to the present invention or the conventional cleaner for a thermostatic water bath was added such that a concentration thereof become predetermined concentration (0.05 w/w %, 0.1 w/w %, and 0.2 w/w %) when a total volume is prepared to be 10 mL. Next, into the test tube, the solution of the test microorganism as obtained in the above described i) was added such that a total volume of the cleaner for a thermostatic water bath and of the solution of the test microorganism is 10 μL.

iii) After a lapse of certain times (5 min, 10 min, and 15 min), the solution of the test microorganism as obtained in the above described ii) was smeared with a platinum loop on the surface of the nutrient agar plate medium preliminarily having been prepared, and the medium was cultured at 35° C.±2° C. for 24 hours.

iv) After the cultivation, confirming the presence or not of the growth of the microorganisms on the surface of the medium was conducted, a minimum concentration of the cleaner for a thermostatic water bath, wherein growth of microorganisms is not recognized, was determined.

(5) Results

The results are shown in Table 4.

In Table 4, a case where growth of the microorganism on the surface of the medium was recognized is shown by +, and a case where growth of the microorganism on the surface of the medium was not recognized is shown by −, respectively.

Abbreviation of each microorganism shown in Table 4 is as described in Experiment 2.

It should be noted that, in Table 4, final concentration of each component in the cleaner for a thermostatic water bath according to the present invention at each concentration, is respectively as follows.

In case of the concentration of the cleaner for a thermostatic water bath is 0.05 w/w %, didecyldimethylammonium adipate is 0.0028 w/w %, N-bis(3-aminopropyl)dodecylamine is 0.0012 w/w %, EDTA4Na is 0.00001 w/w %, polyoxyethylene alkyl ether is 0.00225 w/w %, and sodium lauroylsarcosinate is 0.00025 w/w %.

In case of the concentration of the cleaner for a thermostatic water bath is 0.1 w/w %, didecyldimethylammonium adipate is 0.0056 w/w %, N-bis(3-aminopropyl)dodecylamine is 0.0024 w/w %, EDTA4Na is 0.00002 w/w %, a polyoxyethylene alkyl ether is 0.0045 w/w %, and sodium lauroylsarcosinate is 0.0005 w/w %.

In case of the concentration of the cleaner for a thermostatic water bath is 0.2 w/w %, didecyldimethylammonium adipate is 0.0112 w/w %, N-bis(3-aminopropyl)dodecylamine is 0.0048 w/w %, EDTA4Na is 0.00004 w/w %, a polyoxyethylene alkyl ether is 0.009 w/w %, and sodium lauroylsarcosinate is 0.001 w/w %.

TABLE 4

| Cleaner for a thermostatic water bath | Concentration (w/w %) | Time (min) | B.s | E.c | P.a | S.a |
|---|---|---|---|---|---|---|
| Cleaner for a thermostatic water bath according to the present invention | 0.05 | 5 | + | − | − | − |
| | | 10 | + | − | − | − |
| | | 15 | + | − | − | − |
| | 0.1 | 5 | + | − | − | − |
| | | 10 | + | − | − | − |
| | | 15 | + | − | − | − |
| | 0.2 | 5 | − | − | − | − |
| | | 10 | − | − | − | − |
| | | 15 | − | − | − | − |
| Conventional cleaner for a thermostatic water bath | 0.05 | 5 | + | + | + | + |
| | | 10 | + | + | + | + |
| | | 15 | + | + | + | + |
| | 0.1 | 5 | + | + | + | + |
| | | 10 | + | + | + | + |
| | | 15 | + | + | + | + |
| | 0.2 | 5 | + | − | + | + |
| | | 10 | + | − | + | + |
| | | 15 | + | − | + | + |

As is clear from Table 4, it is found that the cleaner for a thermostatic water bath according to the present invention has, as compared with the conventional cleaner for a thermostatic water bath, higher germicidal activity to microorganisms, especially shows high germicidal activity to *Pseudonas aeruginsa* (P.a) and *Staphylococcus aureus* (S.a). Therefore, it is found that the cleaner can adequately be responsible to requirements for avoidance and prevention from nosocomial infection.

Example 2

Long Time Stability Test 1

(1) Preparation of the Cleaner for a Thermostatic Water Bath According to the Present Invention Such that didecyldimethylammonium adipate is 5.6 w/w %, EDTA4Na is 0.02 w/w %, polyoxyethylene alkyl ether is 4.5 w/w %, and sodium lauroylsarcosinate is 0.5 w/w %, the respective components were dissolved in pure water, and then, pH of the solution was adjusted to 11.4 with an sodium hydroxide aqueous solution. The solution was used as the cleaner for a thermostatic water bath according to the present invention.

(2) Long Time Stability Test

An concentrate of the cleaner for a thermostatic water bath according to the present invention as prepared in the above described (1) or a solution diluted the concentrate with pure water to 0.2 w/w % was added in a thermostatic water bath of which the temperature is room temperature or 40° C., and after the upper part thereof was covered with a transparent film, it was left to stand. After leaving it for a predetermined period of days, appearance, specific gravity (20° C.), viscosity (cst/25° C.), pH and absorbance at 800 to 400 nm, at 340 nm, and at 300 nm, of water in the thermostatic water bath were measured. Moreover, antimicrobial activity in the same method as in Experiment 1, and germicidal activity in treatment for 5 min in the same method as in Example 1, was tested. Results in case of storage at room temperature and results in case of storage at 40° C. were respectively shown in Table 5 and in Table 6.

It should be noted that concentrations of respective agents in the cleaner for a thermostatic water bath diluted to 0.2 w/w % are 0.0112 w/w % in didecyldimethylammonium adipate, 0.00004 w/w % in EDTA4Na, 0.009 w/w % in a polyoxyethylene alkyl ether, and 0.001 w/w % in sodium lauroylsarcosinate.

Abbreviation of each microorganism as shown in each of Tables is respectively as described in Experiment 2.

TABLE 5

| | | Storage period (Storage temperature: room temperature) | | | | | | |
|---|---|---|---|---|---|---|---|---|
| | | Just after preparation | After one month | After two monthes | After three monthes | After four monthes | After five monthes | After six months |
| | | | | | Appearance | | | |
| | | Colorless transparent solution | Colorless transparent solution | Colorless transparent solution | Colorless transparent solution | Colorless transparent solution | Colorless transparent solution | Colorless transparent solution |
| Specific Gavity (20° C.) | Concentrate | 1.004 | 1.005 | 1.002 | 1.003 | 1.003 | 1.002 | 1.002 |
| Viscosity (cSt/25° C.) | Concentrate | 2.80 | 3.02 | 2.79 | 2.76 | 2.78 | 2.77 | 2.79 |
| pH(25° C.) | Concentrate | 9.67 | 9.28 | 9.00 | 8.77 | 8.43 | 8.19 | 7.87 |
| | 0.2 w/w % Aqueous solution | 7.23 | 7.18 | 9.19 | 8.62 | 8.68 | 8.82 | 8.91 |
| absorbance (Concentrate) | 800~400 nm | 0.016 | 0.021 | 0.008 | 0.009 | 0.011 | 0.014 | 0.016 |
| | 340 nm | 0.035 | 0.026 | 0.026 | 0.030 | 0.037 | 0.043 | 0.050 |
| | 300 nm | 0.091 | 0.111 | 0.096 | 0.112 | 0.124 | 0.144 | 0.163 |
| absorbance (0.2 w/w % aqueous solution) | 800~400 nm | 0.007 | 0.002 | 0.000 | 0.006 | 0.004 | 0.005 | 0.003 |
| | 300 nm | 0.011 | 0.004 | 0.001 | 0.009 | 0.007 | 0.008 | 0.008 |
| | 276 nm | 0.010 | 0.005 | 0.000 | 0.007 | 0.009 | 0.012 | 0.014 |

TABLE 5-continued

| | | Storage period (Storage temperature: room temperature) | | | | | | |
|---|---|---|---|---|---|---|---|---|
| | | Just after preparation | After one month | After two monthes | After three monthes | After four monthes | After five monthes | After six months |
| | | | | | Appearance | | | |
| | | Colorless transparent solution | Colorless transparent solution | Colorless transparent solution | Colorless transparent solution | Colorless transparent solution | Colorless transparent solution | Colorless transparent solution |
| Antimicrobial activity | B.s | <125 | <125 | <125 | <125 | <125 | <125 | <125 |
| | E.c | <125 | <125 | <125 | <125 | <125 | <125 | <125 |
| | P.a | 3,000 | 3,000 | 3,000 | 3,000 | 3,000 | 3,000 | 3,000 |
| | S.a | <125 | <125 | <125 | <125 | <125 | <125 | <125 |
| Germicidal activity (μg/ml) | B.s | 2,000 | 2,000 | 2,000 | 2,000 | 2,000 | 2,000 | 2,000 |
| | E.c | <500 | <500 | <500 | <500 | <500 | <500 | <500 |
| | P.a | <500 | <500 | <500 | <500 | <500 | <500 | <500 |
| | S.a | <500 | <500 | <500 | <500 | <500 | <500 | <500 |

TABLE 6

| | | Storage period (Storage temperature: 40° C.) | | | | | | |
|---|---|---|---|---|---|---|---|---|
| | | Just after preparation | After one month | After two monthes | After three monthes | After four monthes | After five monthes | After six months |
| | | | | | Appearance | | | |
| | | Colorless transparent solution | Colorless transparent solution | Colorless transparent solution | Colorless transparent solution | pale-yellow transparent solution | pale-yellow transparent solution | pale-yellow transparent solution |
| Specific Gavity (20° C.) | Concentrate | 1.004 | 1.003 | 1.001 | 1.001 | 1.001 | 1.001 | 1.001 |
| Viscosity (cSt/25° C.) | Concentrate | 2.80 | 2.88 | 2.75 | 2.85 | 2.80 | 2.78 | 2.77 |
| pH(25° C.) | Concentrate | 9.67 | 8.07 | 7.24 | 6.74 | 6.67 | 6.62 | 6.60 |
| | 0.2 w/w % Aqueous solution | 7.23 | 6.65 | 7.94 | 7.94 | 8.25 | 8.61 | 9.07 |
| absorbance (Concentrate) | 800~400 nm | 0.016 | 0.014 | 0.025 | 0.020 | 0.024 | 0.026 | 0.030 |
| | 340 nm | 0.035 | 0.051 | 0.060 | 0.082 | 0.113 | 0.133 | 0.158 |
| | 300 nm | 0.091 | 0.185 | 0.183 | 0.269 | 0.341 | 0.379 | 0.445 |
| absorbance (0.2 w/w % aquesous solution) | 800~400 nm | 0.007 | 0.000 | 0.002 | 0.001 | 0.001 | 0.001 | 0.001 |
| | 300 nm | 0.011 | 0.000 | 0.005 | 0.003 | 0.003 | 0.004 | 0.005 |
| | 276 nm | 0.010 | 0.000 | 0.005 | 0.008 | 0.007 | 0.008 | 0.008 |
| Antimicrobial activity | B.s | <125 | <125 | <125 | <125 | <125 | <125 | <125 |
| | E.c | <125 | <125 | <125 | <125 | <125 | <125 | <125 |
| | P.a | 3,000 | 3,000 | 3,000 | 3,000 | 3,000 | 3,000 | 3,000 |
| | S.a | <125 | <125 | <125 | <125 | <125 | <125 | <125 |
| Germicidal activity (μg/ml) | B.s | 2,000 | 2,000 | 2,000 | 2,000 | 2,000 | 2,000 | 2,000 |
| | E.c | <500 | <500 | <500 | <500 | <500 | <500 | <500 |
| | P.a | <500 | <500 | <500 | <500 | <500 | <500 | <500 |
| | S.a | <500 | <500 | <500 | <500 | <500 | <500 | <500 |

As is clear from Tables 5 and 6, in case of the cleaner for a thermostatic water bath according to the present invention which contains didecyldimethylammonium adipate (the quaternary ammonium salt according to the present invention), almost no change is recognized in specific gravity and viscosity after storage for a long time of 6 months at room temperature, even in the concentrate and in a 0.2 w/w % solution of an embodiment of use. And it maintained effects of both of antimicrobial activity and germicidal activity just after preparation. Further, the cleaner for a thermostatic water bath according to the present invention, which contains didecyldimethylammonium adipate, shows almost no change which might be a practical problem in specific gravity and viscosity even in a condition of leaving it to stand for 6 months at 40° C., and moreover it maintained effects of both of antimicrobial activity and germicidal activity just after preparation.

From the above, it is found that the cleaner for a thermostatic water bath according to the present invention has excellent storage stability for a long time.

Example 3

Long Time Stability Test 2

(1) Preparation of the Cleaner for a Thermostatic Water Bath According to the Present Invention Such that N-bis(3-aminopropyl)dodecylamine is 2.4 w/w %, EDTA4Na is 0.02 w/w %, polyoxyethylene alkyl ether is 4.5 w/w %, and sodium lauroylsarcosinate is 0.5 w/w %, the respective components were dissolved in pure water, and then, pH of the solution was adjusted to 11.4 with an sodium hydroxide aqueous solution. The solution was used as the cleaner for a thermostatic water bath according to the present invention.

(2) Long Time Stability Test

An concentrate of the cleaner for a thermostatic water bath according to the present invention as prepared in the above described (1) or a solution diluted the concentrate with pure water to 0.2 w/w % was added in a thermostatic water bath of which the temperature is room temperature or 40° C., and after the upper part thereof was covered with a transparent film, it was left to stand. After leaving it for a predetermined period of days, appearance, specific gravity (20° C.), viscosity (cst/25° C.), pH and absorbance at 800 to 400 nm, at 340 nm and at 300 nm, of water in the thermostatic water bath were measured. Moreover, antimicrobial activity in the same method as in Experiment 1, and germicidal activity in treatment for 5 min in the same method as in Example 1, was tested. Results in case of storage at room temperature and results in case of storage at 40° C. were respectively shown in Table 7 and in Table 8.

It should be noted that concentrations of respective agents in case of the cleaner for a thermostatic water bath diluted to 0.2 w/w % are 0.0048 w/w % in N-bis(3-aminopropyl)dodecylamine, 0.00004 w/w % in EDTA4Na, 0.009 w/w % in polyoxyethylene alkyl ether, and 0.001 w/w % in sodium lauroylsarcosinate.

Abbreviation of each microorganism as shown in each of Tables is respectively as described in Experiment 2.

TABLE 7

| | | Storage period (Storage temperature: room temperature) | | | | | | |
|---|---|---|---|---|---|---|---|---|
| | | Just after preparation | After one month | After two monthes | After three monthes | After four monthes | After five monthes | After six months |
| | | | | | Appearance | | | |
| | | Colorless transparent solution | Colorless transparent solution | Colorless transparent solution | Colorless transparent solution | Colorless transparent solution | Colorless transparent solution | Colorless transparent solution |
| Specific Gavity (20° C.) | Concentrate | 1.003 | 1.004 | 1.001 | 1.004 | 1.004 | 1.003 | 1.003 |
| Viscosity (cSt/25° C.) | Concentrate | 1.95 | 1.96 | 1.95 | 1.98 | 1.99 | 2.01 | 2.03 |
| pH(25° C.) | Concentrate | 11.48 | 11.76 | 11.59 | 11.55 | 11.66 | 11.68 | 11.73 |
| | 0.2 w/w % Aqueous solution | 9.15 | 9.90 | 9.98 | 9.83 | 9.90 | 9.83 | 9.98 |
| absorbance (Concentrate) | 800~400 nm | 0.002 | 0.014 | 0.014 | 0.018 | 0.019 | 0.021 | 0.022 |
| | 340 nm | 0.030 | 0.061 | 0.068 | 0.088 | 0.103 | 0.124 | 0.140 |
| | 300 nm | 0.147 | 0.173 | 0.191 | 0.246 | 0.289 | 0.359 | 0.406 |
| absorbance (0.2 w/w % aquesous solution) | 800~400 nm | 0.006 | 0.002 | 0.000 | 0.006 | 0.006 | 0.005 | 0.005 |
| | 300 nm | 0.010 | 0.012 | 0.001 | 0.015 | 0.012 | 0.013 | 0.012 |
| | 276 nm | 0.008 | 0.011 | 0.000 | 0.014 | 0.015 | 0.014 | 0.016 |
| Antimicrobial activity | B.s | <125 | <125 | <125 | <125 | <125 | <125 | <125 |
| | E.c | 1,000 | 1,000 | 1,000 | 1,000 | 1,000 | 1,000 | 1,000 |
| | P.a | 2,000 | 2,000 | 2,000 | 2,000 | 2,000 | 2,000 | 2,000 |
| | S.a | <125 | <125 | <125 | <125 | <125 | <125 | <125 |
| Germicidal activity (μg/ml) | B.s | 2,000 | 2,000 | 2,000 | 2,000 | 2,000 | 2,000 | 2,000 |
| | E.c | <500 | <500 | <500 | <500 | <500 | <500 | <500 |
| | P.a | <500 | <500 | <500 | <500 | <500 | <500 | <500 |
| | S.a | <500 | <500 | <500 | <500 | <500 | <500 | <500 |

TABLE 8

| | | Storage period (Storage temperature: 40° C.) | | | | | | |
|---|---|---|---|---|---|---|---|---|
| | | Just after preparation | After one month | After two monthes | After three monthes | After four monthes | After five monthes | After six months |
| | | | | | Appearance | | | |
| | | Colorless transparent solution | pale-yellow transparent solution | pale-yellow transparent solution | pale-yellow transparent solution | pale-yellow transparent solution | pale-yellow transparent solution | pale-yellow transparent solution |
| Specific Gavity (20° C.) | Concentrate | 1.003 | 1.003 | 1.001 | 1.002 | 1.001 | 0.112 | 1.001 |
| Viscosity (cSt/25° C.) | Concentrate | 1.95 | 1.87 | 1.88 | 1.88 | 1.94 | 1.99 | 2.07 |
| pH(25° C.) | Concentrate | 11.48 | 11.70 | 11.40 | 11.53 | 11.64 | 11.68 | 11.76 |
| | 0.2 w/w % Aqueous solution | 9.15 | 9.91 | 10.00 | 9.70 | 9.82 | 9.88 | 10.21 |
| absorbance (Concentrate) | 800~400 nm | 0.002 | 0.020 | 0.026 | 0.034 | 0.044 | 0.056 | 0.064 |
| | 340 nm | 0.030 | 0.125 | 0.177 | 0.255 | 0.319 | 0.394 | 0.498 |
| | 300 nm | 0.147 | 0.313 | 0.434 | 0.615 | 0.872 | 1.025 | 1.119 |

TABLE 8-continued

| | | Storage period (Storage temperature: 40° C.) | | | | | | |
|---|---|---|---|---|---|---|---|---|
| | | Just after preparation | After one month | After two monthes | After three monthes Appearance | After four monthes | After five monthes | After six months |
| | | Colorless transparent solution | pale-yellow transparent solution | pale-yellow transparent solution | pale-yellow transparent solution | pale-yellow transparent solution | pale-yellow transparent solution | pale-yellow transparent solution |
| absorbance (0.2 w/w % aquesous solution) | 800~400 nm | 0.006 | 0.002 | 0.000 | 0.002 | 0.002 | 0.003 | 0.002 |
| | 300 nm | 0.010 | 0.005 | 0.001 | 0.005 | 0.006 | 0.005 | 0.004 |
| | 276 nm | 0.008 | 0.006 | 0.001 | 0.005 | 0.006 | 0.005 | 0.007 |
| Antimicrobial activity | B.s | <125 | <125 | <125 | <125 | <125 | <125 | <125 |
| | E.c | 1,000 | 1,000 | 1,000 | 1,000 | 1,000 | 1,000 | 1,000 |
| | P.a | 2,000 | 2,000 | 2,000 | 2,000 | 2,000 | 2,000 | 2,000 |
| | S.a | <125 | <125 | <125 | <125 | <125 | <125 | <125 |
| Germicidal activity (μg/ml) | B.s | 2,000 | 2,000 | 2,000 | 2,000 | 2,000 | 2,000 | 2,000 |
| | E.c | <500 | <500 | <500 | <500 | <500 | <500 | <500 |
| | P.a | <500 | <500 | <500 | <500 | <500 | <500 | <500 |
| | S.a | <500 | <500 | <500 | <500 | <500 | <500 | <500 |

As is clear from Tables 7 and 8, in case of the cleaner for a thermostatic water bath according to the present invention which contains N-bis(3-aminopropyl)dodecylamine (the preservative agent having amphoteric surface activity according to the present invention), almost no change is recognized in specific gravity, viscosity, and pH after storage for a long time of 6 months at room temperature, even in the concentrate and in the 0.2 w/w % solution of an embodiment of use. And it maintained effects of both of antimicrobial activity and germicidal activity just after preparation. Further, the cleaner for a thermostatic water bath according to the present invention shows almost no change which might be a practical problem in specific gravity, viscosity, and pH even in a condition of leaving it to stand for 6 months at 40° C., and moreover it maintained effects of both of antimicrobial activity and germicidal activity just after preparation.

From the above, it is found that the cleaner for a thermostatic water bath according to the present invention has excellent storage stability for a long time.

Furthermore, as is clear from comparing the results with the results of Example 2 (Tables 5 and 6), the cleaner for a thermostatic water bath according to the present invention, which contains N-bis(3-aminopropyl)dodecylamine, shows almost no change in pH even under storage for a long time. Moreover, it is found that it has more excellent antimicrobial activity to *Pseudonas aeruginosa* (P.a).

Example 4

Long Time Stability Test 3

The concentrate of the cleaner for a thermostatic water bath according to the present invention as prepared in Example 1 or a solution diluted the concentrate with pure water to 0.2 w/w % was added in a thermostatic water bath of which the temperature is room temperature or 40° C., and after the upper part thereof was covered with a transparent film, it was left to stand. After leaving it for a predetermined period of days, appearance, specific gravity (20° C.), viscosity (cst/25° C.), pH and absorbance at 800 to 400 nm, at 340 nm and at 300 nm, of water in the thermostatic water bath were measured. Moreover, antimicrobial activity in the same method as in Experiment 1 and germicidal activity in treatment for 5 min in the same method as in Example 1 were tested. Results in case of storage at room temperature and results in case of storage at 40° C. were respectively shown in Table 5 and in Table 6.

It should be noted that concentrations of respective agents in case of cleaner for a thermostatic water bath diluted to 0.2 w/w % are 0.0112 w/w % in didecyldimethylammonium adipate, 0.0048 w/w % in N-bis(3-aminopropyl)dodecylamine, 0.00004 w/w % in EDTA4Na, 0.009 w/w % in a polyoxyethylene alkyl ether, and 0.001 w/w % in sodium lauroylsarcosinate.

In Tables 9 and 10, a mark of "-" indicates a case where measurement was not conducted.

Abbreviation of each microorganism as shown in each of Tables is respectively as described in Experiment 2.

TABLE 9

| | | Storage period (Storage temperature: room temperature) | | | | | | |
|---|---|---|---|---|---|---|---|---|
| | | Just after preparation | After one month | After two monthes | After three monthes Appearance | After four monthes | After five monthes | After six months |
| | | Colorless transparent solution | Colorless transparent solution | Colorless transparent solution | Colorless transparent solution | Colorless transparent solution | Colorless transparent solution | Colorless transparent solution |
| Specific Gavity (20° C.) | Concentrate | 1.000 | 1.003 | 1.001 | 1.000 | 0.999 | 0.999 | 1.000 |

TABLE 9-continued

| | | Storage period (Storage temperature: room temperature) | | | | | | |
|---|---|---|---|---|---|---|---|---|
| | | Just after preparation | After one month | After two monthes | After three monthes | After four monthes | After five monthes | After six months |
| | | Appearance | | | | | | |
| | | Colorless transparent solution | Colorless transparent solution | Colorless transparent solution | Colorless transparent solution | Colorless transparent solution | Colorless transparent solution | Colorless transparent solution |
| Viscosity (cSt/25° C.) | Concentrate | 4.94 | 4.99 | 4.99 | 5.06 | 5.07 | 5.09 | 5.10 |
| pH(25° C.) | Concentrate | 11.39 | 11.53 | 11.23 | 11.12 | 10.97 | 10.96 | 11.03 |
| | 0.2 w/w % Aqueous solution | 9.97 | — | 9.16 | 9.75 | 9.61 | 9.76 | 9.93 |
| absorbance (Concentrate) | 800~400 nm | 0.015 | 0.014 | 0.014 | 0.017 | 0.021 | 0.012 | 0.010 |
| | 340 nm | 0.060 | 0.066 | 0.066 | 0.073 | 0.082 | 0.074 | 0.077 |
| | 300 nm | 0.188 | 0.191 | 0.185 | 0.194 | 0.208 | 0.207 | 0.223 |
| absorbance (0.2 w/w % aqueous solution) | 800~400 nm | 0.002 | 0.003 | 0.005 | 0.003 | 0.004 | 0.003 | 0.001 |
| | 300 nm | 0.003 | 0.006 | 0.009 | 0.008 | 0.012 | 0.008 | 0.004 |
| | 276 nm | 0.003 | 0.004 | 0.010 | 0.009 | 0.016 | 0.008 | 0.006 |
| Antimicrobial activity | B.s | <125 | <125 | <125 | <125 | <125 | <125 | <125 |
| | E.c | <125 | <125 | <125 | <125 | <125 | <125 | <125 |
| | P.a | 2,000 | 2,000 | 2,000 | 2,000 | 2,000 | 2,000 | 2,000 |
| | S.a | <125 | <125 | <125 | <125 | <125 | <125 | <125 |
| Germicidal activity (μg/ml) | B.s | 2,000 | 2,000 | 2,000 | 2,000 | 2,000 | 2,000 | 2,000 |
| | E.c | <500 | <500 | <500 | <500 | <500 | <500 | <500 |
| | P.a | <500 | <500 | <500 | <500 | <500 | <500 | <500 |
| | S.a | <500 | <500 | <500 | <500 | <500 | <500 | <500 |

TABLE 10

| | | Storage period (Storage temperature: 40° C.) | | | | | | |
|---|---|---|---|---|---|---|---|---|
| | | Just after preparation | After one month | After two monthes | After three monthes | After four monthes | After five monthes | After six months |
| | | Appearance | | | | | | |
| | | Colorless transparent solution | Colorless transparent solution | Colorless transparent solution | Colorless transparent solution | Colorless transparent solution | Colorless transparent solution | Colorless transparent solution |
| Specific Gavity (20° C.) | Concentrate | 1.000 | 1.000 | 0.999 | 0.999 | 0.999 | 0.999 | 0.998 |
| Viscosity (cSt/25° C.) | Concentrate | 4.94 | 5.07 | 5.02 | 5.19 | 5.25 | 5.31 | 5.33 |
| pH(25° C.) | Concentrate | 11.39 | 11.44 | 11.14 | 11.11 | 10.99 | 10.96 | 10.88 |
| | 0.2 w/w % Aqueous solution | 9.97 | — | 9.53 | 9.60 | 9.51 | 9.74 | 9.86 |
| absorbance (Concentrate) | 800~400 nm | 0.015 | 0.020 | 0.021 | 0.030 | 0.031 | 0.029 | 0.030 |
| | 340 nm | 0.060 | 0.090 | 0.118 | 0.186 | 0.219 | 0.277 | 0.346 |
| | 300 nm | 0.188 | 0.215 | 0.283 | 0.420 | 0.490 | 0.618 | 0.776 |
| absorbance (0.2 w/w % aqueous solution) | 800~400 nm | 0.002 | 0.004 | 0.003 | 0.005 | 0.006 | 0.004 | 0.002 |
| | 300 nm | 0.003 | 0.006 | 0.006 | 0.010 | 0.014 | 0.011 | 0.008 |
| | 276 nm | 0.003 | 0.005 | 0.008 | 0.011 | 0.019 | 0.014 | 0.013 |
| Antimicrobial activity | B.s | <125 | <125 | <125 | <125 | <125 | <125 | <125 |
| | E.c | <125 | <125 | <125 | <125 | <125 | <125 | <125 |
| | P.a | 2,000 | 2,000 | 2,000 | 2,000 | 2,000 | 2,000 | 2,000 |
| | S.a | <125 | <125 | <125 | <125 | <125 | <125 | <125 |
| Germicidal activity (μg/ml) | B.s | 2,000 | 2,000 | 2,000 | 2,000 | 2,000 | 2,000 | 2,000 |
| | E.c | <500 | <500 | <500 | <500 | <500 | <500 | <500 |
| | P.a | <500 | <500 | <500 | <500 | <500 | <500 | <500 |
| | S.a | <500 | <500 | <500 | <500 | <500 | <500 | <500 |

As is clear from Tables 9 and 10, in case of the cleaner for a thermostatic water bath according to the present invention, almost no change is recognized in appearance, specific gravity, viscosity, pH, and absorbance after storage for a long time of 6 months at room temperature, even in the concentrate and in the 0.2 w/w % solution of an embodiment of use. And it maintained effects of both of antimicrobial activity and germicidal activity just after preparation. Further, the cleaner for a thermostatic water bath according to the present invention shows almost no change which might be a practical problem in appearance, specific gravity, viscosity, pH and absorbance even in a condition of leaving it to stand for 6 months at 40°

C., and moreover it maintained effects of both of antimicrobial activity and germicidal activity just after preparation.

From the above, it is found that the cleaner for the thermostatic water bath according to the present invention has excellent storage stability for a long time.

Furthermore, as is clear from comparing the results with the results of Example 2 (Tables 5 and 6) and the results of Example 3 (Tables 7 and 8), the cleaner for a thermostatic water bath according to the present invention, which contains both of the quaternary ammonium salt and the preservative agent having amphoteric surface activity, shows almost no change in appearance, specific gravity, pH, and absorbance even under storage for a long time, and it can keep high antimicrobial activity to *Escherichia coli* (E.c.) and *Pseudonas aeruginsa* (P.a.) even under storage for a long time. Therefore, it can be understood that it is more excellent than the cleaner for a thermostatic water bath according to the present invention, which respectively contains the single one thereof.

INDUSTRIAL APPLICABILITY

The present invention provides an excellent cleaner for a thermostatic water bath, which can be used for a scientific apparatus, particularly an automatic analyzer, having a thermostatic water bath with water as medium to prevent generation of microorganisms (bacteria, etc.) in water in the water bath and accompanying deterioration of the measurement accuracy and also prevent generation and attachment of air bubbles on the outer wall of a reaction vessel in the water bath and produces no (or less) substance having absorption in the measurement wavelength range of 300 to 900 nm due to decomposition of some of its components at the time of storage, and which has further stronger germicidal effect than conventional ones. Thus, by using the cleaner according to the present invention, it is possible to obtain pronounced effects in the ability of making use of quick operation, high efficiency, high accuracy and convenient handling as primary merits of the automatic analyzer to greater extents than before.

What is claimed is:

1. A method comprising:
adding a cleaner into water provided in a thermostatic water bath for preventing generation of microorganisms and generation and attachment of air bubbles on the outer wall of a reaction vessel in the thermostatic water bath, and for producing no substances having absorption in the wavelength range of 300 to 900 nm in the water provided in the thermostatic water bath, the cleaner comprising:
a quaternary ammonium salt represented by the following general formula I and/or a preservative agent having amphoteric surface activity, and a surface active agent:

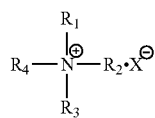

[I]

wherein $R_1$ to $R_4$ are each independently an alkyl group, with the proviso that at least one of $R_1$ to $R_4$ is an alkyl group having 8 to 18 carbon atoms, and at least one of them is a lower alkyl group having 1 to 3 of carbon atoms; and X is an anion derived from a carboxylic acid having two or more carbon atoms.

2. The method according to claim 1, wherein the cleaner comprises the quaternary ammonium salt and the preservative agent having amphoteric surface activity and the surface active agent.

3. The method according to claim 1, wherein the quaternary ammonium salt is didecyldimethyl ammonium adipate.

4. The method according to claim 1, wherein the preservative agent having amphoteric surface activity is N-bis(3-aminopropyl) dodecyl amine.

5. The method according to claim 1, wherein the surface active agent is a nonionic surface active agent or an anionic surface active agent.

6. The method according to claim 1, wherein the cleaner further comprises a chelating agent.

7. The method according to claim 6, wherein the chelating agent is an ethylenediaminetetraacetic acid salt.

8. The method according to claim 1, wherein the cleaner further comprises a reagent that makes the liquid property alkaline.

9. The method according to claim 8, wherein the reagent that makes a liquid property alkaline is sodium hydroxide.

10. The method according to claim 1, wherein the surface active agent is a polyoxyethylene alkyl ether and/or sodium lauroyl sarcosinate.

11. The method according to claim 1, wherein the liquid property of the cleaner shows alkaline of pH of 10 to 12.

12. The method according to claim 1, wherein the liquid property of the water in the thermostatic water bath shows alkaline of pH of 10 to 12.

13. A method comprising:
adding a cleaner into water provided in a thermostatic water bath for preventing generation of microorganisms and generation and attachment of air bubbles on the outer wall of a reaction vessel in the thermostatic water bath, and for producing no substances having absorption in the wavelength range of 300 to 900 nm in the water provided in the thermostatic water bath, the cleaner comprising:
a quaternary ammonium salt represented by the following general formula I and/or a preservative agent having amphoteric surface activity, and a surface active agent:

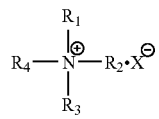

[I]

wherein $R_1$ to $R_4$ are each independently an alkyl group, with the proviso that at least one of $R_1$ to $R_4$ is an alkyl group having 8 to 18 carbon atoms, and at least one of them is a lower alkyl group having 1 to 3 of carbon atoms; and $X^-$ is an anion derived from a carboxylic acid having two or more carbon atoms, and
wherein the quaternary ammonium salt is didecyldimethyl ammonium adipate, the preservative agent having amphoteric surface activity is N-bis(3-aminopropyl) dodecyl amine, and the surface active agent is polyoxyethylene alkyl ether and/or sodium lauroyl sarcosinate.

* * * * *

UNITED STATES PATENT AND TRADEMARK OFFICE
CERTIFICATE OF CORRECTION

PATENT NO. : 7,727,949 B2  Page 1 of 1
APPLICATION NO. : 11/885477
DATED : June 1, 2010
INVENTOR(S) : Kazuhide Manabe et al.

It is certified that error appears in the above-identified patent and that said Letters Patent is hereby corrected as shown below:

Claim 1, col. 32, line 2: "X" should read -- $X^-$ --

Signed and Sealed this

Thirteenth Day of July, 2010

David J. Kappos
*Director of the United States Patent and Trademark Office*